E. T. GREENFIELD.
HOSE.
APPLICATION FILED OCT. 3, 1908.
967,901.
Patented Aug. 23, 1910.
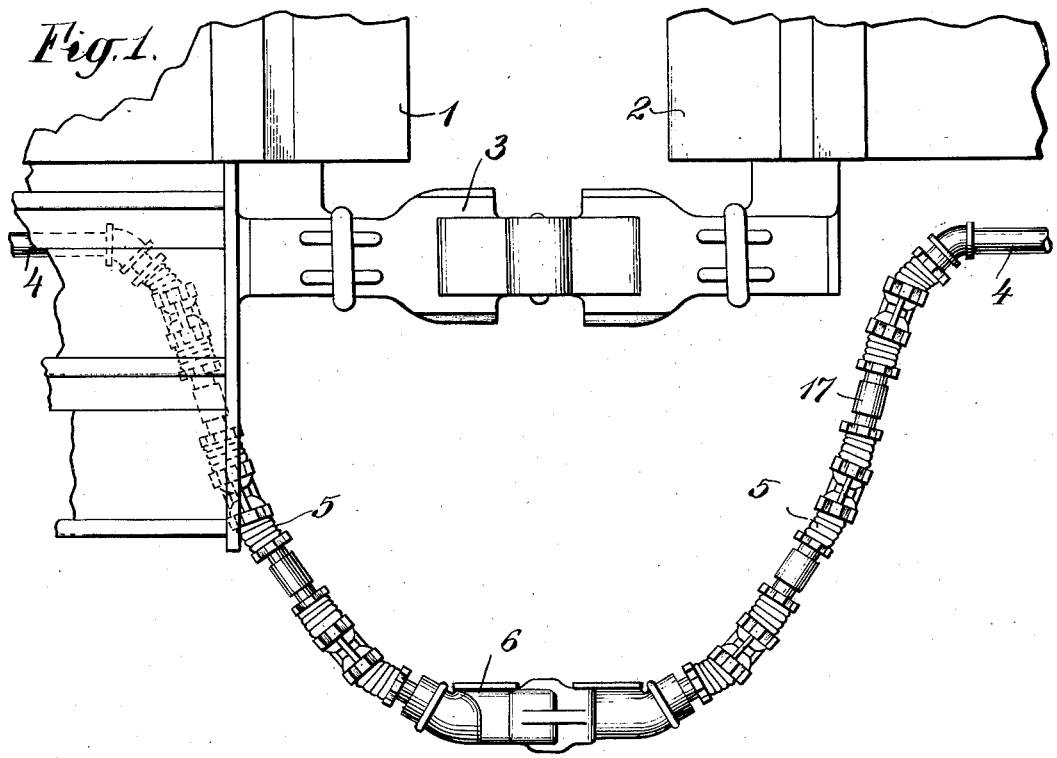
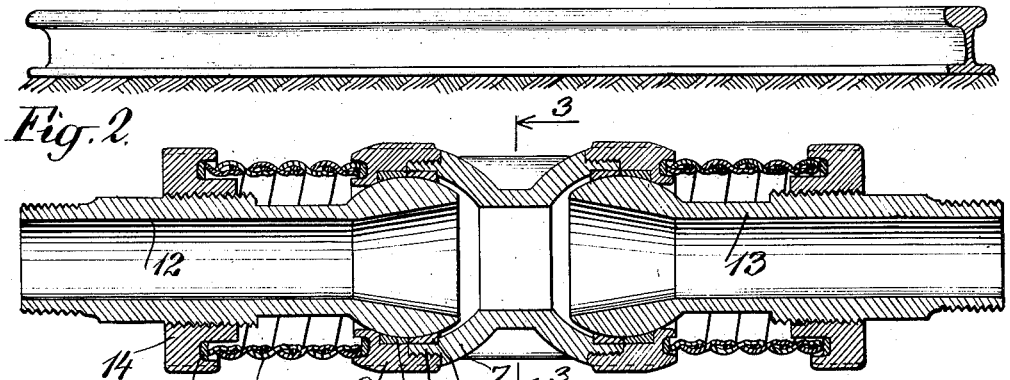
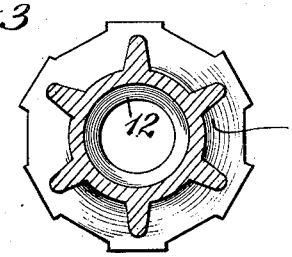
WITNESSES
INVENTOR
BY
ATTORNEY

UNITED STATES PATENT OFFICE.

EDWIN T. GREENFIELD, OF KIAMESHA, NEW YORK.

HOSE.

967,901.       Specification of Letters Patent.     Patented Aug. 23, 1910.

Application filed October 3, 1908. Serial No. 456,077.

*To all whom it may concern:*

Be it known that I, EDWIN T. GREENFIELD, a citizen of the United States, residing at Kiamesha, in the county of Sullivan and State of New York, have invented a certain new and useful Improvement in Hose, of which the following is a specification.

This invention relates to flexible hose adapted particularly for carrying steam or air under pressure.

The object of the invention is to provide a hose for this use of an improved construction, such that while ample flexibility is obtained, the hose will carry the steam or air under pressure without leakage and the joints therein will not become worn even after a long period of use.

The invention is directed particularly to the provision of a flexible hose which may be employed as an end-connector for a steam or air train-pipe upon a railway car.

I have illustrated a preferred embodiment of my invention in the accompanying drawings, in which—

Figure 1 is an elevation of two lengths of the hose as used for connecting the train-pipes of adjacent cars of a railway-train; Fig. 2 is a sectional view of a portion of the hose; and Fig. 3 is a transverse section on the line 3—3 of Fig. 2.

Referring first to Fig. 1, 1 and 2 indicate two adjacent cars of a train, these being coupled together at 3 in the usual manner. On each of the cars is a pipe 4 for carrying steam or compressed air. The ends of the pipes 4 of the two adjacent cars are connected together by flexible end-connectors 5, each of which is connected to a pipe 4 at one end and has fixed thereto at the other end a coupling-member 6, whereby the free ends of the two end-connectors are detachably joined so as to complete the passage for the steam or compressed air from the pipe 4 on one car to that on the other.

The construction of the flexible hose constituting the end-connectors 5 is shown in Figs. 2 and 3. Referring to these figures, 7 indicates a short, tubular, metallic, connecting piece, the ends of which are enlarged, and the walls of these enlarged ends are curved so that the ends of the opening through the piece are semi-spherical. The walls of the piece 7 at the extreme ends thereof are reduced in thickness so as to provide an internal circumferential groove and an external circumferential groove on opposite sides of a thin end-portion 8. The exterior of each end-portion 8 is threaded, as shown. An annular metallic member 9 is provided with two internal circumferential grooves, one corresponding to the internal circumferential groove on the piece 7 and the other adapted to receive the extension 8, and the wall of this last-named groove is threaded to coact with the threads on the extension 8. The corresponding internal grooves on the pieces 7 and 9 are adapted to receive gaskets 10 and 11 respectively, these gaskets lying side by side. The gaskets 10 and 11 are made of a non-compressible material and one which will withstand wear for a considerable period. 12 and 13 indicate tubular metallic members, the adjacent ends of which enter within the opposite ends of the metallic piece 7. These ends of the pieces 12 and 13 are spherically formed and are of such size that they fit very tightly within the gaskets 10 and 11. Each of the pieces 12 and 13 is threaded at its opposite end and is also provided with threads intermediate its ends. These intermediate threads are adapted to receive internally threaded collars 14, the exterior surfaces of which are formed to coact with a wrench. Circumferential grooves are formed in the adjacent faces of each annulus 9 and collar 14, and in the bottom of each of these grooves as a compressible gasket 15. A casing 16 of spirally formed metallic strip incloses each of the tubular pieces 12 and 13, its ends being received in the grooves in the adjacent faces of the annulus 9 and collar 14 and bearing upon the gaskets therein. The tubular piece 7 is provided with integral flanges extending lengthwise thereof between the enlarged ends, and the annuli 9 have their exterior surfaces irregularly formed, so that these parts may be readily gripped with wrenches, in order to turn them relatively to secure them tightly together.

A plurality of hose members constructed as shown in Fig. 2 and as above described are employed to form a length of flexible hose, the ends of these members being connected together by internally threaded collars 17, into which the threaded ends of the tubular members 13 and 12 are inserted. A hose thus constructed may be flexed in any direction and when so flexed the tubular members 12 and 13 turn relatively to the members 7, with the rounded ends of the members 12 and 13 sliding upon the gaskets 10 and 11. The casings 16 flex during such relative movement of the parts, as is well understood, and thus at all times protect the hose against injury due to dust collecting upon the rounded heads of the members 12 and 13 and being carried thereby between those ends and the gaskets 10 and 11.

By the construction above described, a hose may be provided which will carry steam and air under considerable pressure and may be used for a long period without leakage due to the wearing away of the parts. The annuli 9 and the piece 7 hold the gaskets 10 and 11 firmly in position. These gaskets are made of a material which is so hard that it will not be worn away in use and will not be affected by the steam, and they are of such size that the rounded heads of the members 12 and 13 fit snugly within them. Notwithstanding this tight fit, however, the hose may be readily flexed in any direction, the heads of the members 12 and 13 turning within the gaskets 10 and 11.

The material which I prefer to employ in making the gaskets is vulcabeston, as I have found in practice that with this material hard non-compressible gaskets can be made which will maintain a steam-tight joint, permit free flexure, and not be worn away though used continually for a long period.

In assembling the parts, a gasket is placed in the groove in the connecting member 7 and one in the annulus 9 and these two parts are then secured together by means of the threads thereon so that the gaskets will be held tightly in position.

Having now described my invention, what I claim as new therein and desire to secure by Letters Patent is as follows:—

1. In a hose, a tubular member, a gasket within one end thereof, an annulus secured to said end and holding said gasket in place, a second tubular member the end of which has a spherically formed outer surface entering within said end of the first tubular member and coacting with said gasket, and a tubular casing flexible in the direction of its length, inclosing and extending lengthwise of said second tubular member but spaced apart therefrom, said casing having its ends fixed relatively to said annulus and said second tubular member, substantially as set forth.

2. In a hose, a tubular member, a gasket within one end thereof, an annulus secured to said end and holding said gasket in place, a second tubular member the end of which has a spherically formed outer surface entering within said end of the first tubular member and coacting with said gasket, and a flexible casing of spirally formed strip-metal having adjacent convolutions thereof interlocking coacting at one end with said annulus and at the other with a part on said second tubular member, substantially as set forth.

3. In a hose, a tubular member, a gasket within one end thereof, an annulus secured to said end and holding said gasket in place, a second tubular member the end of which has a spherically formed outer surface entering within said end of the first tubular member and coacting with said gasket, a collar on said second tubular member intermediate its ends, said collar and annulus having circular grooves in the adjacent faces thereof, and a flexible casing extending between said collar and annulus, its ends being received in said grooves, substantially as set forth.

4. In a hose, a tubular member having a gasket within one end thereof and an annulus secured to said end and holding said gasket in place, a second tubular member the end of which has a spherically formed outer surface entering within said end of the first tubular member and coacting with said gasket, a flexible casing inclosing and extending lengthwise of said second tubular member, a supporting member on said second tubular member having a groove therein, a groove in said first tubular member, and gaskets in said grooves with which the ends of said casing coact, substantially as set forth.

5. In a hose, a tubular member having a gasket within one end thereof and an annulus secured to said end and holding said gasket in place, a second tubular member the end of which has a spherically formed outer surface entering within said end of the first tubular member and coacting with said gasket, a supporting member on said second tubular member, said supporting member and said annulus having circular grooves in the adjacent faces thereof, and a flexible casing of spirally-formed strip metal having adjacent convolutions thereof interlocking, the ends of said casing entering said grooves, substantially as set forth.

6. In a hose, a tubular member having a gasket within one end thereof and an annulus secured to said end and holding said gasket in place, a second tubular member the end of which has a spherically formed outer surface entering within said end of the first tubular member and coacting with said gasket, and a tubular casing flexible in the direction of its length, inclosing and extending lengthwise of said second tubular member but spaced apart therefrom, said casing having its ends fixed one to each of said tubular members, substantially as set forth.

7. In a hose, a tubular member having a gasket within one end thereof and an annulus secured to said end and holding the gasket in place, a second tubular member the end of which has a spherically formed outer surface entering within said end of the first tubular member and coacting with said gasket, and a flexible casing of spirally formed strip-metal having adjacent convolutions thereof interlocking, said casing having its ends fixed one to each of said tubular members, substantially as set forth.

This specification signed and witnessed this 28th day of Sep., 1908.

EDWIN T. GREENFIELD.

Witnesses:
WILLIAM T. RUELI,
HARRY H. HORNSBY.